(12) United States Patent
Schneider

(10) Patent No.: US 6,363,969 B1
(45) Date of Patent: Apr. 2, 2002

(54) CARTRIDGE FOR A SINGLE-HANDLE MIXER FAUCET

(75) Inventor: Hermann-Josef Schneider, Schweich (DE)

(73) Assignee: American Standard International Inc., New York, NY (US)

( * ) Notice: Subject to any disclaimer, the term of this patent is extended or adjusted under 35 U.S.C. 154(b) by 0 days.

(21) Appl. No.: 09/830,952

(22) PCT Filed: Oct. 25, 1999

(86) PCT No.: PCT/EP99/08094

§ 371 Date: Aug. 10, 2001

§ 102(e) Date: Aug. 10, 2001

(87) PCT Pub. No.: WO00/26565

PCT Pub. Date: May 11, 2000

(30) Foreign Application Priority Data

Nov. 3, 1998 (AT) ................................................ 1825/98

(51) Int. Cl.[7] ............................................ F16K 11/078
(52) U.S. Cl. ............................... 137/625.17; 137/625.4; 251/285; 251/287
(58) Field of Search ........................ 137/625.17, 625.4; 251/285, 287

(56) References Cited

U.S. PATENT DOCUMENTS

| | | | | |
|---|---|---|---|---|
| 4,375,225 A | * | 3/1983 | Andersson | 137/625.17 |
| 4,708,172 A | * | 11/1987 | Riis | 137/625.17 |
| 4,733,688 A | * | 3/1988 | Lorch | 137/625.17 X |
| 4,768,749 A | | 9/1988 | Oberdörfer | |
| 4,941,509 A | * | 7/1990 | Orlandi | 137/625.17 |
| 5,522,429 A | | 6/1996 | Bechte et al. | |
| 5,538,041 A | * | 7/1996 | Anzle | 137/625.17 |
| 5,794,650 A | * | 8/1998 | Nikolayczik | 137/625.17 X |

FOREIGN PATENT DOCUMENTS

| | | |
|---|---|---|
| DE | 3822 217 | 1/1996 |
| EP | 0699 856 | 3/1996 |

* cited by examiner

*Primary Examiner*—John Rivell

(57) ABSTRACT

The invention relates to a cartridge for a single lever mixer faucet comprising a fixed (4) and a moveable sealing washer (3) which are arranged in a housing (1), whereby the movable sealing washer (3) comprises a recess (15) for engaging with a control tappet (9) of a control handle (11) which traverses a pivot support (10). The invention provides that the moveable sealing washer (3) comprises, on the surface thereof which faces the control tappet (9) and which is located in the area of the outer periphery of the washer (3), a step (14) which serves as a volume stop that can cross over with regard to the pivot support (10).

3 Claims, 1 Drawing Sheet

CARTRIDGE FOR A SINGLE-HANDLE MIXER FAUCET

Figure 1:
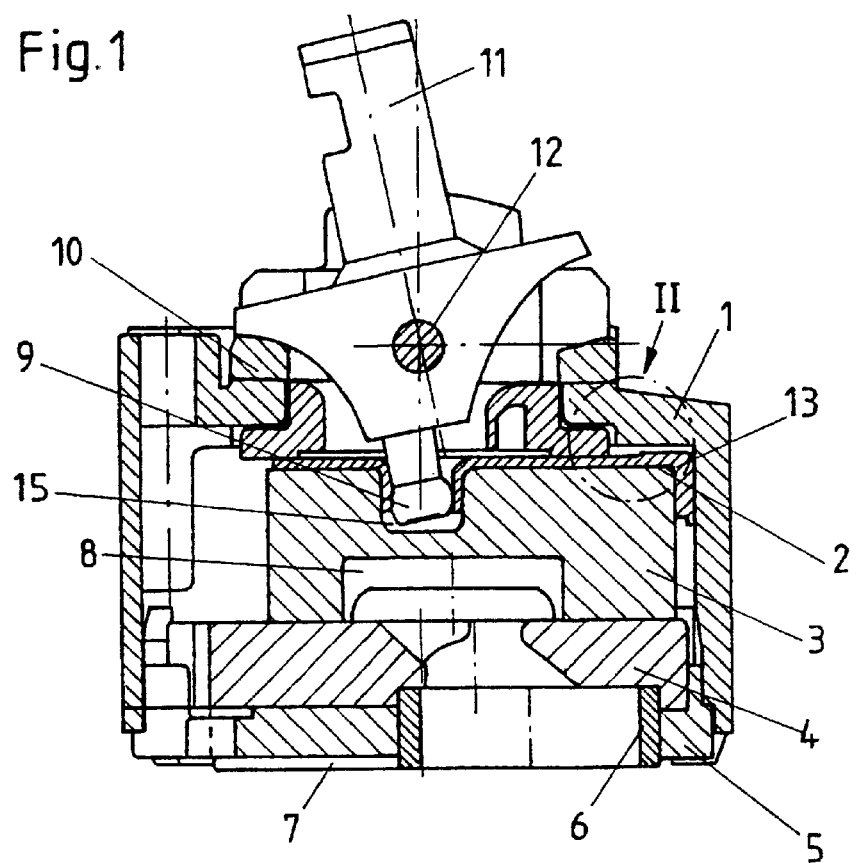

The invention relates to a cartridge for a single-lever mixing valve with a rigid and a movable sealing disk arranged in a housing, with the movable sealing disk having a recess for engaging a control pin of a control lever contained in a pivot holder.

In conventional single-lever mixing valves, the rate of flow through the valve is determined by the lifting or lowering of a handle lever rigidly connected to the control lever, whereas the temperature is determined by swinging it to the left or right. Correspondingly, the lifting or lowering of the handle lever causes the control pin rigidly connected to the handle lever to displace the movable sealing disk in the cartridge in relation to the rigid sealing disk. When the valve is closed, the handle lever is fully lowered. When the handle lever is lifted, displacement of the movable handle lever causes the mixing chamber present in the movable sealing disk to arrive at the rigid sealing disk, over the cold and/or warm water passage as well as the mixed water passage, so that mixed water can emerge. If the single-lever mixing valve is symmetrically designed in the conventional manner, the complete lifting of the handle lever effects maximum passage of mixed water through the valve.

If the temperature of the emerging water is of no relevance to the user of the single-lever mixing valve, he will lift the handle lever to the middle position, namely to the stop, even if he does not need so great a rate of flow. Such is the case primarily because the operating path of the handle lever is relatively short, so that the user is not concerned with regulating the rate of water flow. But, as a result, a greater amount of water as well as energy—since we are speaking of mixed water—is of course wasted than is actually needed.

There are now cartridges in which an additional structural component is inserted in order to prevent unintentional complete opening of the valve. This structural component can be a spring element which, when pressure is applied, can allow for complete opening of the valve. However, the manufacture of the structural component and its assembly in the cartridge is time-consuming and costly.

The object of the present invention is to create, without additional expenditure of time or cost, a single-lever mixing valve of the type mentioned at the outset which releases the maximum rate of flow only when such is intentionally set by the user. In other words, there should be less of a rate of flow than was the case until now for the opening of the valve and without regard for the temperature or rate of flow, and yet this should afford the possibility of the comfort of a great rate of flow.

This object is achieved in that the movable sealing disk is provided, on its surface in the area of its outer perimeter facing the control pin, with a step acting as a volume-overriding stop opposite the pivot holder.

When the handle lever is now lifted, the swiveling movement is transferred to the control pin and the latter displaces the movable sealing disk in relation to the rigid disk. In so doing, according to the invention, the step comes closer to the edge of the pivot holder until it finally strikes the latter. The height of the step is henceforth selected in such a way that, with increased pressure on the handle lever, i.e., when the opening moment on the handle lever is increased, the disk aggregate consisting of the rigid and the movable sealing disk, is moved downward against the contact pressure of the seals during the entry of water and during its exit, and against the water pressure, and as a result, the step can be overridden to the point where there is a maximum rate of flow. In conventional use, without special regard for temperature or amount of water, the user will lift the handle lever and, hence, displace the movable sealing disk only up to the stop of the pivot holder at the step on the sealing disk. If he consciously wishes to draw more water, he can deliberately accomplish this by vigorously lifting the handle lever.

It is known how a sealing disk holder so called can be provided between the movable sealing disk and the pivot holder. Such a sealing disk holder serves as a slide bearing when the movable sealing disk is moved against the pivot holder and the control pin is moved in the recess of the movable sealing disk. The sealing disk holder is not movable with regard to the sealing disk because of engagement in the recess of the latter. According to the invention, the step is provided in such a sealing disk holder, which is arranged on the surface of the movable sealing disk facing the control pin and which engages the recess in the sealing disk. This makes it possible to use a conventional sealing disk and yet require no additional structural component.

One or both edges of the step and the pivot holder coming into contact are preferably tapered or rounded. This produces a definite resistance being felt when the step is overridden, but no tilting can occur.

Figure 2:
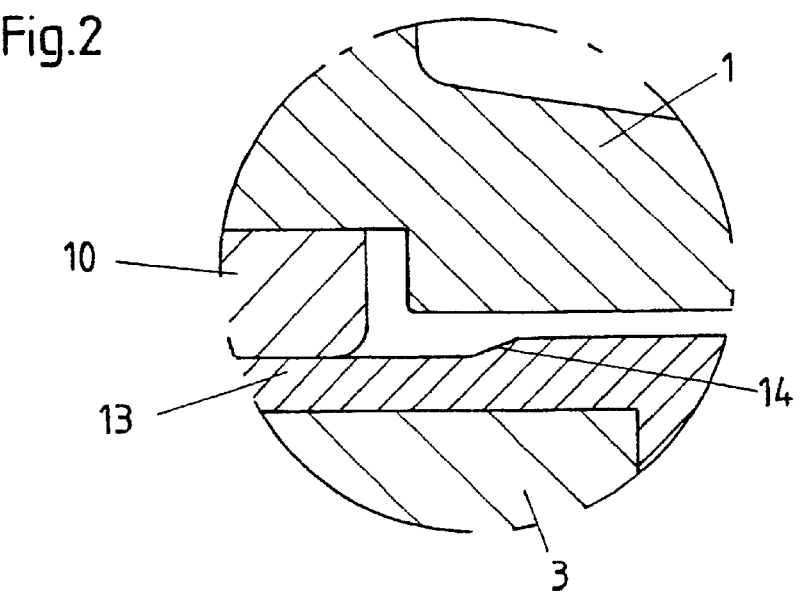

The invention will now be described in greater detail on the basis of the appended drawings, where FIG. 1 shows a cartridge according to the invention and FIG. 2 shows a detail of FIG. 1 identified by a dot-and-dash circle.

A rigid sealing disk 4 and a movable sealing disk 3 are inserted in a housing 1, with the seals 6 and 7 which are contained in the cartridge bottom 5, being inserted in recesses for the passage of the cold, warm and mixed water in rigid sealing disk 4. When the cartridge is assembled, these seals 6 and 7 are pressed together and produce a contact pressure of rigid sealing disk 4 on movable sealing disk 3. A mixing chamber 8 is provided in movable sealing disk 3 which, depending on the position of movable sealing disk 3, communicates with the water inlets and/or mixed water outlet in rigid sealing disk 4. Located on the opposite surface of sealing disk 3 which faces control lever 11 of the single-lever mixing valve, is a recess 15 into which control pin 9 of control lever 11 engages. In so doing, control lever 1 1 penetrates pivot holder 10, on which control lever 11 is mounted on a shaft 12. The handle lever (not shown) is mounted on control lever 11.

In the example of embodiment shown, a sealing disk holder 13 is arranged on the surface of the movable sealing disk 3 which has a step 14 on the outer perimeter of the movable sealing disk.

When the handle lever is lifted, the control lever 11 swivels around shaft 12, as a result of which control pin 9 also swivels around shaft 12, displacing the movable sealing disk 3 in relation to the rigid sealing disk 4. This causes the surfaces of pivot holder 10 and of sealing disk holder 13 facing each other to slide over each other until step 14 in sealing disk holder 13 strikes at the lower edge of pivot holder 10. The height of step 14 is selected in such a way that when greater force is imparted on the handle lever there is a further displacement of the movable sealing disk 3 in that movable sealing disk 3, together with rigid sealing disk 4, is displaced against the contact pressure of seals 6 and 7 and against the prevailing water pressure in the direction of cartridge bottom 5 so that the lower edge of pivot holder 10 can slide over step 14 in the sealing disk holder 13. Thus, as a result of an increase in the resistance to sliding at the point where step 14 meets pivot holder 10, an "end point" is set for the conventional water discharge without regard for temperature or amount. This is a water-saving measure, which is integrated in the cartridge and for which no additional part is needed and for which, therefore, no increase in assembling costs is required. No additional costs are entailed for the manufacture of the cartridge; yet water can simply be saved with this device without, on the other hand, sacrificing the comfort of a strong flow rate as heretofore, when such is desired.

What is claimed is:

1. Cartridge for a single-lever mixing valve with a rigid and a movable sealing disk arranged in a housing, with the movable sealing disk having a recess for engaging a control pin of a control lever contained in a pivot holder, characterized in that the movable sealing disk (3) has a step (14) on its surface in the area of its outer perimeter facing the control pin (9) acting as a volume-overriding stop against the pivot holder (10).

2. Cartridge according to claim 1, characterized in that the step (14) is provided in a sealing disk holder (13) which is arranged on the surface of the movable sealing disk (3) facing the sealing disk holder and which engages the recess (15) in the sealing disk (3) which engages the control pin (9).

3. Cartridge according to claim 1 or 2, characterized in that one or both of the edges of the step (14) and of the pivot holder (10) meeting one another are tapered or rounded.

* * * * *